(12) United States Patent
Mueller et al.

(10) Patent No.: US 7,090,770 B2
(45) Date of Patent: Aug. 15, 2006

(54) FILTER CLOTH AND METHOD FOR PRODUCING THE SAME

(75) Inventors: Hans Rudolf Mueller, Zurich (CH); Christoph Maurer, Zurich (CH)

(73) Assignee: Sefar AG, Ruschlikon (CH)

( * ) Notice: Subject to any disclaimer, the term of this patent is extended or adjusted under 35 U.S.C. 154(b) by 464 days.

(21) Appl. No.: 10/276,701

(22) PCT Filed: Jan. 23, 2001

(86) PCT No.: PCT/EP01/00713

§ 371 (c)(1),
(2), (4) Date: Nov. 18, 2002

(87) PCT Pub. No.: WO01/87454

PCT Pub. Date: Nov. 22, 2001

(65) Prior Publication Data

US 2003/0111405 A1    Jun. 19, 2003

(30) Foreign Application Priority Data

May 18, 2000  (EP)  ................................. 00110619

(51) Int. Cl.
  *B01D 39/08* (2006.01)
(52) U.S. Cl. ...................... 210/227; 210/445; 210/499; 210/500.1; 55/527

(58) Field of Classification Search .................. 55/527; 139/420 R; 210/224, 227, 228, 445, 490, 210/495, 499, 500.1, 505, 508, 231; 442/49, 442/50
See application file for complete search history.

(56) References Cited

U.S. PATENT DOCUMENTS 3,382,985 A * 5/1968 Muehl .......................... 210/495
5,477,891 A * 12/1995 Benesi ..................... 139/383 R
6,103,132 A * 8/2000 Seyfried et al. ............. 210/791

FOREIGN PATENT DOCUMENTS

| DE | 10 03 185 | | 2/1957 |
| EP | 0 521 512 | | 1/1993 |
| JP | 09075638 A | * | 3/1997 |
| JP | 10 043529 | | 2/1998 |

* cited by examiner

*Primary Examiner*—Terry K. Cecil
(74) *Attorney, Agent, or Firm*—Oblon, Spivak, McClelland, Maier & Neustadt, P.C.

(57) ABSTRACT

The invention relates to a filter cloth for a filter press and to a method for producing said filter cloth. The inventive filter cloth has a filtration section through which the filtrate reaches a filter element of the filter press, and an edging section which rests against the edge of the filter element. The filtration area is provided with a cloth that differs from that of the edging section. The filtration area is woven from monofil yarns while multifil yarns are woven into the edging section.

11 Claims, 3 Drawing Sheets

FILTER CLOTH AND METHOD FOR PRODUCING THE SAME

Figure 1:
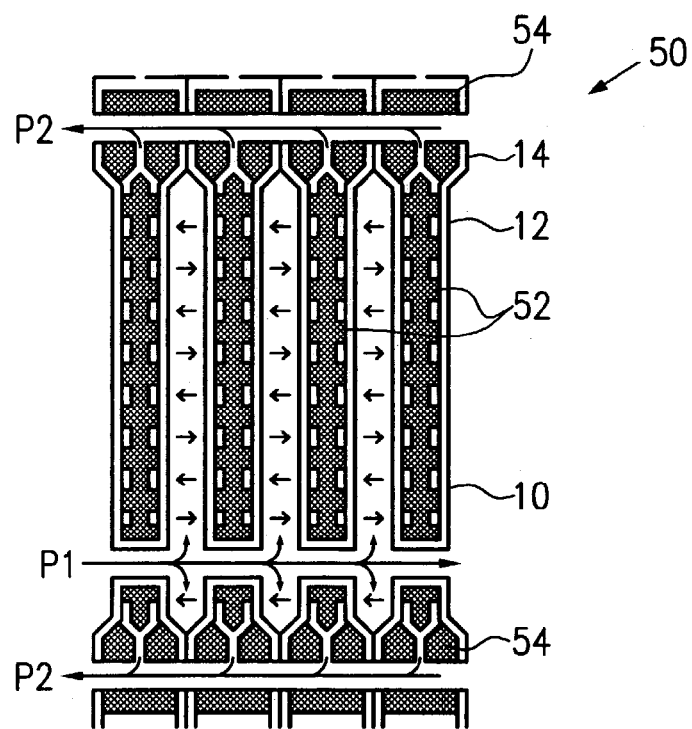

The invention relates to a filter cloth for a filter press, having a filtration area through which filtrate can pass into a filter element of the filter press, and a border area which is provided for application to an edge of the filter element. The invention also relates to a method for the manufacture of the filter cloth for a filter press.

A filter press is a discontinuously operating filtration device, which is more particularly used in the raw material, foodstuffs, pharmaceutical and chemical industries. The filter press generally comprises a large number of parallel-linked, plate-like filter elements, between which are located filter cloths. The filter elements may not only be plate-like, but can also have a different shape. The faces of the plate group are bounded by a fixed wall or cover plate and a movable pressure plate. The pressure plate presses together the plate-like filter elements, which are made from metal, plastic or some other suitable material and as a result the filter press is closed. Subsequently a suspension to be filtered is introduced into the filter press, filtrate passing through the filter cloth whilst forming a filter cake thereon and is led off via corresponding channels on the plate-like filter element. For removing the filter cake formed, the axial tensile force is relieved and the plate-like filter elements separated. The filter cake formed on the individual filter cloths is ejected or is scraped off by means of a doctor blade.

As a result of the method the axial force for pressing together the filter elements must be so high that it significantly exceeds the filling pressure of the suspension to be filtered. The filter cloth used for a filter press not only serves as a filtering medium, but also as a seal along the filter element edge, where the adjacent filter elements are pressed against one another. To ensure that this sealing function is adequately performed, particularly at the contact surface between the filter element edge and the filter cloth, said filter cloth must have an adequate deformability, so that liquid passages are prevented.

However, in the vicinity of the filtration surface of the filter cloth a very dimensionally stable, robust filter cloth structure is desired.

It is known to weave a filter cloth from monofilament yarns, which are also known as plastic wires. However, a fabric formed from monofilament yarns is unsuitable for sealing the edges of the filter elements, because the wire-like yarns do not adequately elastically deform under the axial contact pressure and tend to break during prolonged operational loads.

Therefore multifilament yarn fabrics are used for filter cloths for filter presses. Such multifilament yarns, which is also understood to cover hereinafter staple fibre yarns, comprise a plurality of fibres, which leads to an improved deformability under pressure and therefore a desired sealing action. However, a disadvantage of such multifilament yarn fabrics is that in the filtration area solid attachments form between the individual fibres of a multifilament yarn and such fabrics mat together and/or clog after a relatively short operating period. Thus, multifilament yarn filter cloths when used on a filter press require relatively frequent replacement or cleaning, which reduces the degree of utilization of a filter press and leads to corresponding costs when replacing said filter cloths.

The object of the invention is to provide a filter cloth, which permits a particularly economic operation of a filter press. A further object is to provide an economic method for the manufacture of such a filter cloth.

The first part of the object is achieved by a filter cloth having the features of claim 1. According to the invention, the second part of the object is achieved by a method having the features of claim 8. Preferred embodiments of the invention are given in the dependent claims.

The filter cloth according to the invention is characterized in that the filtration area has a fabric differing from that of the border area, that the filtration area is preponderantly woven from monofilament yarns and that preponderantly multifilament yarns are woven in the border area.

In this way, in the case of the filter cloth according to the invention, it is possible to combine the advantages of a monofilament fabric and a multifilament fabric. Through the use of monofilament yarns in the filtration area it is possible to ensure a particularly robust and consequently long-life filtering medium, even under relatively rough operating conditions in a filter press. As a result of the smooth yarn surface of the monofilament yarn a reliable and substantially complete discharge of the filter cake from the filtration area is ensured. In addition, the monofilament fabric ensures a high shear strength and excellent dimensional stability. The use of multifilament yarns in the border area, which engages on the projecting edge of the filter element, ensures an adequate deformability, which is essential for a good sealing function. Whereas in the case of multifilament filter cloths of a conventional nature, through having to take account of the sealing function, the filter cloth openings are relatively fine throughout, the filter cloth according to the invention permits a significant freedom of design with regard to the size of the openings in the filtration area. The openings preferably have a size between 10 and 100 um. The filter cloth can also be used in other filters, in which there is a similar problem of a simultaneous filtering and sealing function.

To a certain extent there can also be multifilament yarns in the filtration area. A particularly robust, long-life filter cloth for a filter press is obtained according to the invention in that the filtration area is woven exclusively from monofilament yarns.

It is also possible to provide only multifilament yarns in the border area. According to a further development of the invention, in the border area are woven both multifilament yarns and monofilament yarns. Through the combination of the two yarns in the border area it is ensured that on the one hand an adequate deformability and elasticity is ensured through the multifilament yarns and on the other the monofilament yarns ensure an adequate stability against tearing. Preferably preponderantly multifilament yarns are used in the border area to ensure a good sealing function.

To ensure an adequate sealing function in the aforementioned embodiment, it is preferable for the multifilament yarns in the border area to be located preponderantly on the side of the filter cloth facing the filter element. Thus, the contact surface between the edge of the filter element and the filter cloth being supported is particularly problematical with regards to sealing. On pressing together two facing filter elements with filter cloths spread out thereon, the contact surface between the individual filter cloths is scarcely problematical, because even on pressing together two monofilament fabrics an adequate seal against the passage of liquid is ensured. Conversely in the filtration area the monofilament yarns are preponderantly on the filter cake side in order to ensure a good and substantially complete discharge of the filter cake.

According to a further development of the invention the filter cloth is constructed as a double layer fabric, a lower fabric layer facing the filter element is a backing fabric and an upper fabric layer is constructed as a filtration-active layer. The upper fabric layer can be adjusted in such a way that there is a desired opening size for the passage of filtrate. For this purpose relatively fine yarns can be used, whereas the lower fabric layer can be made from a wide meshed fabric with relatively thick yarns.

According to the invention the use time of the filter cloth can be increased in that a border area located in the discharge direction of a filter cake formed is provided on its top surface remote from the filter element preponderantly or exclusively with monofilament yarns. During filter cake discharge over the marginal area, the problem arises that filter cake residues can stick to the filter cloth in said marginal area. On closing the filter press again, these residues constitute a very considerable burden for the filter cloth, so that such residues frequently cause damage to the filter cloth. A fabric of monofilament yarns with smooth top surface ensures a reliable sliding off of the filter cake and consequently reduces the filter cloth damage risk. The filter cloth can be produced with an angular, round or other shape. For so-called tower filter presses with progressively circulating filter cloth belt, the filter cloth can be constructed as an annular, closed belt with a plurality of transverse borders.

The method according to the invention for the manufacture of a filter cloth for a filter press is characterized in that the filtration area is woven differently from the border area, that the filtration area is preponderantly woven from monofilament yarns and that in the border area preponderantly multifilament yarns are woven. In this way the aforementioned filter cloth according to the invention can be economically manufactured.

According to a further development of this method, it is particularly economically advantageous for the filter cloth to be made up from a length of fabric and for the latter to be produced in a width corresponding to a desired side length of the filter cloth. The filter cloth for a filter press with predetermined filter element dimensions can in this way be woven and finished, e.g. heat treated and/or stretched and can be produced by simply cutting to length the length of fabric.

Preferably, along the marginal edges of the length of fabric and corresponding to the desired border area of the filter cloth, multifilament yarns are used as warp threads. As opposed to this, for forming the filtration area monofilament yarns are used here as warp threads. In these areas monofilament yarns are also used as weft threads.

According to another embodiment of the method according to the invention, corresponding to the other side length of the quadrangular filter cloth in transversely directed portions of the length of fabric multifilament yarns are used as weft threads for forming the border area. This method permits simple manufacture of the filter cloth according to the invention with the specifically constructed filter areas and border areas by weaving, finishing and making up.

The invention is further illustrated hereinafter by preferred embodiments described in greater detail relative to the attached drawings, wherein show:

FIG. 1 A part cross-sectional view through a filter press during filtration.

Figure 2:
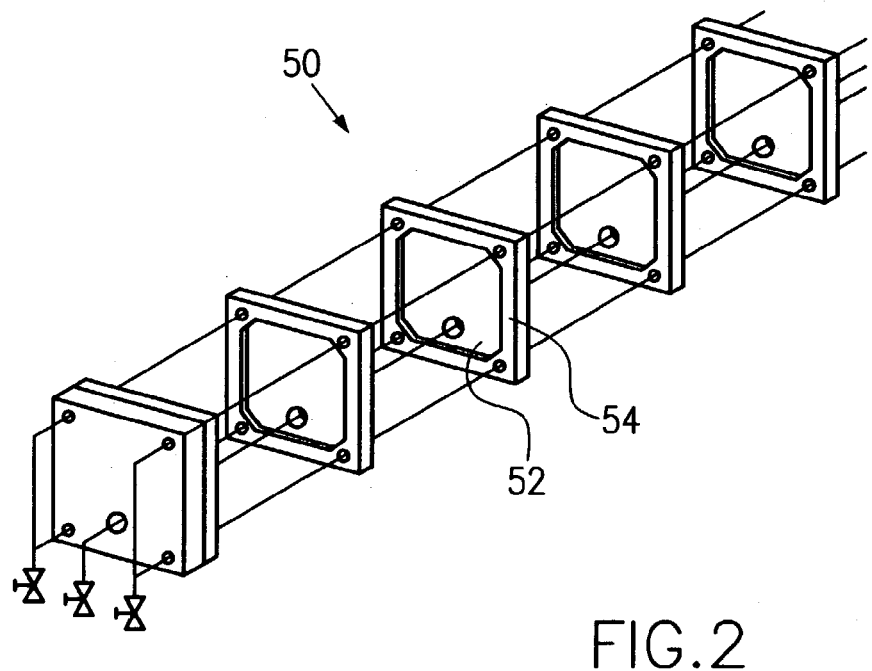

FIG. 2 A perspective view of a filter press with separated filter elements.

Figure 3:
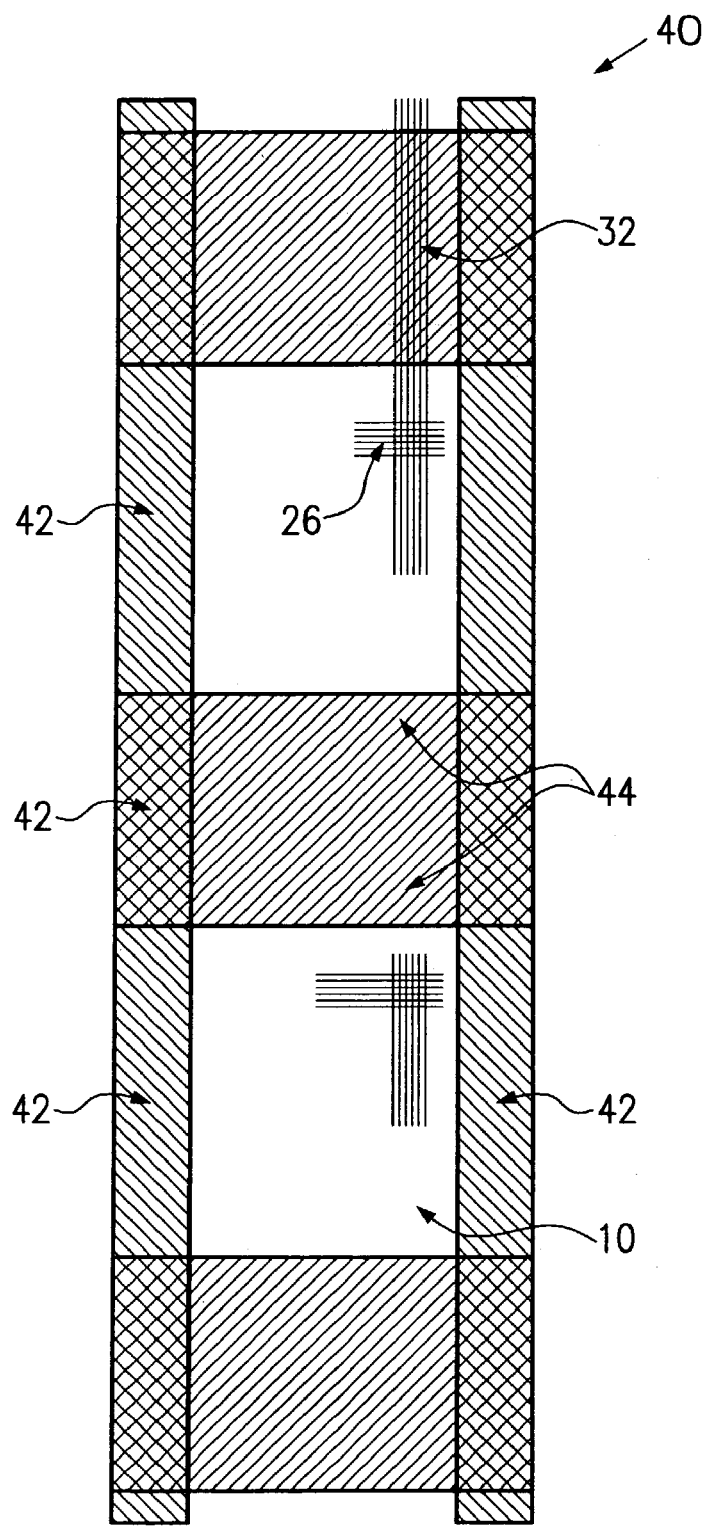

FIG. 3 A plan view of the length of fabric for producing a filter cloth according to the invention.

Figure 4:
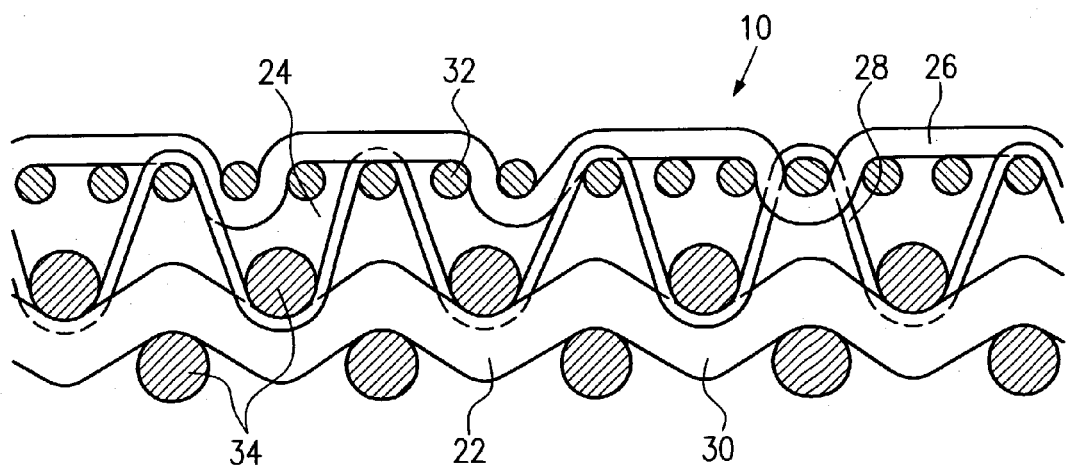

FIG. 4 A part cross-sectional view through a fabric of a filter cloth according to the invention.

The basic operating principle of a filter press 50 and the arrangement of the filter cloth 10 according to the invention is diagrammatically illustrated by FIGS. 1 and 2. The filter press 50 comprises several plate-like filter elements 52, which have a central filtration portion provided with outflow channels and surrounded by a frame-like, projecting edge 54. The arrangement of the outflow channels and the edge 54 on the filter elements 52 is bilateral. A filter cloth 10 is placed on both sides of the filter element 52 and a one-piece filter cloth 10 can be used by turning over on one side of the filter element 52.

For filtration operation the filter press 50 is closed, in that the parallel filter elements 52 are pressed axially against one another. The edges 54 of the individual filter elements 52 are adjacent to one another, the filter cloth 10 resting on the edge 54 sealing the contact surface. In accordance with arrow P1 a suspension to be filtered can be introduced under pressure into the cavity between the filter elements 52. Accompanied by the formation of a filter cake at the filtration area 12 of the filter cloth 10, the filtrate penetrates through the filter cloth 10 and runs out through the outflow channels in the filter elements 52 and central channels in accordance with the arrow P2. On reaching a given filter cake height the filter press 50 is opened in accordance with FIG. 2, the filter cake formed on the filter cloth 10 dropping downwards or being scraped off.

To comply with the different conditions during filtration operation, the border area 14 of the filter cloth 10 according to the invention and which rests on the raised edge 54 of the filter element 52, has a fabric formed preponderantly from multifilament yarns. However, in its filtration area 12, the so-called filtration window, the filter cloth 10 has a fabric formed preponderantly from monofilament yarns.

The manufacture of a filter cloth 10 according to the invention will be explained in conjunction with FIG. 3. The filter cloth 10 is made up from a length of fabric 40 produced by a conventional weaving method by weaving longitudinally directed warp threads with transversely directed weft threads. The length of fabric 40 is woven and finished in accordance with a desired width of the filter cloth 10 and in accordance with the desired border area 14 along the marginal edges 42 monofilament yarns are used as warp threads. In a transversely directed portion 44, which is also intended to serve as a border area 14 as so-called transverse borders of the filter cloth 10 to be made up, additionally multifilament yarns are used as weft threads. The width of the transversely directed portion 44 is designed for a turn round the edge 54 of the filter element 52 or roughly twice as large as the desired width of the border area 14. In the latter case cutting of the filter cloth 10 from the length of fabric 40 would take place in the centre of portion 44, so that the filter cloths 10 can be made up without waste from the length of fabric 40. In other areas of the length of fabric 40 mainly monofilament yarns are used both as warp threads and weft threads.

FIG. 4 is a part cross-sectional view through a filter cloth 10 according to the invention with a double layer fabric. Said double layer fabric comprises a lower backing fabric 22 facing the filter element, whilst on the so-called filter cake or satin side there is a finer meshed fabric as filtration-active layer 24. In all there are an upper weft thread 26, a central binding thread 28 and a lower weft thread, which are woven with fine, upper warp threads 32 and lower, larger warp threads 34.

The upper weft threads 26 and the upper, fine warp threads 32 form the filtration-active layer 24, whereas the upper weft thread 26 is always a monofilament yarn. Corresponding to the arrangement in a border area 14 or a filtration area 12, the upper warp threads 32 can be multifilament or monofilament yarns.

The lower backing fabric 22 is formed by the lower warp threads 34 and the lower weft threads 30 and said threads can be multifilament yarns in a border area 14. The central binding threads 28 serve to provide a reliable connection of the filtration-active layer 24 with the underlying backing fabric 22.

The invention claimed is:

1. Filter cloth for a filter press, comprising:
a filtration area defining a filter cake side and through which filtrate can pass into a filter element of the filter press; and
a border area surrounding the filtration area and adapted for sealing application to a corresponding peripheral edge of the filter element;
wherein the filtration area has a fabric differing from that of the border area, and the filtration area is preponderantly woven from monofilament yarns and preponderantly multifilament yarns are woven in the border area, and
wherein the multifilament yarns used in the border area are interwoven with the monofilament yarns of the filtration area.

2. Filter cloth according to claim 1, wherein the filtration area is exclusively woven from monofilament yarns.

3. Filter cloth according to claim 1, wherein in the border area both multifilament yarns and monofilament yarns are woven.

4. Filter cloth according to claim 3, wherein in the border area the multifilament yarns are preponderantly located on a side of the filter cloth facing the filter element.

5. Filter cloth according to claim 1, wherein the filter cloth is constructed as a double layer fabric, a lower fabric layer facing the filter element is a backing fabric, and an upper fabric layer is constructed as a filtration-active layer.

6. Filter cloth according to claim 1, wherein the border area is located in a discharge direction of a formed filter cake and has on a top side remote from the filter element preponderantly monofilament yarns.

7. Filter cloth according to claim 6, wherein in the filtration area the monofilament yarns are preponderantly located on a side of the filter cake remote from the filter element.

8. Method for manufacture of a filter cloth for a filter press according to claim 1, wherein the filtration area is woven differently from the border area, the filtration area is preponderantly woven from monofilament yarns, and in the border area preponderantly multifilament yarns are woven, and wherein the multifilament yarns used in the border area are interwoven with the monofilament yarns of the filtration area.

9. Method according to claim 8, wherein the filter cloth is manufactured from a length of fabric, produced with a width corresponding to a desired side length of the filter cloth.

10. Method according to claim 9, wherein along a marginal edge of the length of fabric and corresponding to the border area of the filter cloth, multifilament yarns are used as warp threads.

11. Method according to claim 10, wherein the filter cloth is rectangular, and wherein in accordance with another side length of the rectangular filter cloth in transversely directed portions of a length of fabric multifilament yarns are used as weft threads for forming the border area.

* * * * *